United States Patent
Fuchigami

(10) Patent No.: US 8,451,345 B2
(45) Date of Patent: May 28, 2013

(54) FLICKER REDUCTION DEVICE, INTEGRATED CIRCUIT, AND FLICKER REDUCTION METHOD

(75) Inventor: Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 218 days.

(21) Appl. No.: 13/126,561

(22) PCT Filed: Nov. 18, 2009

(86) PCT No.: PCT/JP2009/006194
§ 371 (c)(1),
(2), (4) Date: Apr. 28, 2011

(87) PCT Pub. No.: WO2010/058567
PCT Pub. Date: May 27, 2010

(65) Prior Publication Data
US 2011/0205394 A1 Aug. 25, 2011

(30) Foreign Application Priority Data
Nov. 20, 2008 (JP) .................................. 2008-296352

(51) Int. Cl.
*H04N 9/73* (2006.01)
(52) U.S. Cl.
USPC .................... 348/226.1; 348/222.1
(58) Field of Classification Search
USPC ............... 348/207.99, 222.1, 226.1
See application file for complete search history.

(56) References Cited

U.S. PATENT DOCUMENTS

| | | | |
|---|---|---|---|
| 6,710,818 B1 | 3/2004 | Kasahara et al. | |
| 7,995,112 B2 * | 8/2011 | Kinoshita et al. | 348/226.1 |
| 2006/0055823 A1 | 3/2006 | Kinoshita et al. | |
| 2006/0284992 A1 * | 12/2006 | Kinoshita | 348/226.1 |
| 2007/0013785 A1 | 1/2007 | Kinoshita et al. | |
| 2007/0046790 A1 | 3/2007 | Nakasuji et al. | |
| 2008/0303920 A1 * | 12/2008 | Kinoshita | 348/226.1 |

FOREIGN PATENT DOCUMENTS

| | | |
|---|---|---|
| JP | 2001-111887 | 4/2001 |
| JP | 2004-222228 | 8/2004 |
| JP | 2006-345368 | 12/2006 |
| JP | 2007-28573 | 2/2007 |
| JP | 2007-67736 | 3/2007 |
| JP | 2009-17213 | 1/2009 |

OTHER PUBLICATIONS

International Search Report issued Dec. 15, 2009 in International (PCT) Application No. PCT/JP2009/006194.

* cited by examiner

*Primary Examiner* — Tuan Ho
(74) *Attorney, Agent, or Firm* — Wenderoth, Lind & Ponack, L.L.P.

(57) ABSTRACT

Line integration unit 31 performs integration on digital image signals of a horizontal line. Sampling unit 32 samples, as a second line integral, a first line integral relating to each of at least one but not all of horizontal lines constituting one frame. Memory 33 stores acquired second line integrals corresponding to a plurality of frames. Inter-screen DFT unit 34 performs discrete Fourier transform on a second line integral sequence composed of a second line integral most recently sampled by the sampling unit 32b and the second line integrals stored in the memory 33. Flicker extraction unit 35 extracts information of flicker component based on a result of the discrete Fourier transform. Flicker coefficient calculation unit 36 calculates a flicker coefficient based on the information. Correction operation unit 37 performs operation of reducing the flicker component on the image signals based on the flicker coefficient.

7 Claims, 8 Drawing Sheets

FLICKER REDUCTION DEVICE, INTEGRATED CIRCUIT, AND FLICKER REDUCTION METHOD

TECHNICAL FIELD

The present invention relates to an art of reducing, from image signals relating to a captured image, components of flicker that appears on the captured image as a phenomenon of increase and decrease in brightness due to light flickering.

BACKGROUND ART

An example of a conventional imaging device having a flicker reduction function is disclosed in Patent Literature 1. According to this example, integration is performed on pixel values for each horizontal line, and line integrals resulting from the integration are stored such that the number of the stored line integrals is equal to the number of frames, which is equivalent to the greatest common divisor of a flicker cycle and a frame cycle. Calculation is performed to obtain an average of the line integrals relating to the horizontal lines at the same vertical position in the respective frames. The obtained average is output as a line integral from which the flicker has been reduced. Analysis on flicker component is performed based on the line integral normalized by the average.

FIG. 8 is a block diagram showing a principal structure of a commonly-used conventional imaging device having a flicker reduction function such as the imaging device disclosed in the Patent Literature 1.

According to an imaging device 1000 shown in FIG. 8, an imaging optical component 1001 is composed of a lens, a diaphragm, and so on. An imaging element 1002 is an area image sensor that converts light, which is formed as an image on an imaging surface, into an electrical signal. The imaging optical component 1001 adjusts an amount of light from a subject by the diaphragm, and forms an image of the subject on the imaging surface of the imaging element 1002.

A system controller 1003 is composed of a microprocessor and so on, and controls the whole imaging device 1000. An optical driver 1004 adjusts a zoom, a focal point, the diaphragm, and so on of the imaging optical component 1001, in accordance with an instruction issued by the system controller 1003. An IS control unit (image sensor control unit) 1005 controls the imaging element 1002 in accordance with an instruction issued by the system controller 1003.

An AFE (analog front end) unit 1006 performs, under control of the system controller 1003, analog signal processing on the analog image signal output by the imaging element 1002, and outputs a digital image signal resulting from the analog signal processing. A digital signal processing unit 1007 performs digital signal processing on the digital image digital output by the AFE unit 1006 to generate an image signal for output from the imaging device 1000. The digital signal processing unit 1007 is composed of a flicker reduction unit 21, a signal processing unit 1022 and so on. The flicker reduction unit 21 reduces flicker component. The signal processing unit 1022 performs, on a digital image signal, white balance adjustment, gamma adjustment, image format conversion in accordance with an output image format, and so on.

FIG. 9 is a block diagram showing a structure of the flicker reduction unit shown in FIG. 8.

According to the flicker reduction unit 1021 shown in FIG. 9, a line integration unit 1031 performs, for each horizontal line, integration on digital image signals constituting the horizontal line output by the AFE unit 1006 to obtain a line integral. A memory 1032 stores therein the line integral obtained for each horizontal line by the line integration unit 1031 such that the number of line integrals is equal to a several number of frames or fields. The description is given here based on frames.

A difference calculation unit 1033 calculates a difference between a first line integral output by the line integration unit 1031 and a second line integral read from the memory 1032, and outputs the calculated difference to a normalization unit 1035. Here, the second line integral is a line integral, which is stored in the memory 1032 and corresponds to a frame that is immediately previous to a frame of a horizontal line relating to the first line integral, and the horizontal lines are at the same position in respective frames, that is, the same vertical coordinate. An average calculation unit 1034 calculates an average of line integral based on the first line integral output by the line integration unit 1031 and the second line integrals read from the memory 1032. A normalization unit 1035 divides the difference output by the difference calculation unit 1033 by the average output by the average calculation unit 1034 to obtain a normalized difference.

A DFT (Discrete Fourier Transform) unit 1036 performs a discrete Fourier transform on the normalized difference output by the normalization unit 1035 to obtain a Fourier coefficient. A flicker coefficient calculation unit 1037 specifies an amplitude and a phase of each order of a flicker component based on the Fourier coefficient output by the DFT unit 1036. Then, based on the specified amplitudes and phases, the flicker coefficient calculation unit 1037 generates a flicker coefficient corresponding to a pixel value that is currently input to the flicker reduction unit 1021. A correction operation unit 1038 performs a flicker correction operation, which is an operation for correcting flicker on an image input to the flicker reduction unit 1021, based on the flicker coefficient output by the flicker coefficient calculation unit 1037. Specifically, the correction operation unit 1038 divides the input pixel value by a value, which is obtained by adding 1 to the flicker coefficient, to obtain a correction value from which flicker has been reduced.

The following describes the schematic operations of the flicker reduction unit 1021 of the conventional imaging device 1000 having the above structure.

The line integrals calculated by the line integration unit 1031 are stored in the memory 1032 such that the number of the stored line integrals is less than, by 1, the number of frames necessary for the average calculation unit 1034 to calculate an average. Here, the number of frames necessary for average calculation corresponds to a time period based on a frequency cycle, which is equivalent to the greatest common divisor of a flicker frequency of lighting and a frame rate, such that an average to be obtained is equal to a line integral from which an influence of flicker has been eliminated. For example, when the flicker frequency is 100 Hz and the frame rate is 60 fps (frame per second), the greatest common divisor is 20 Hz and the above time period corresponds to three frames.

The difference calculation unit 1033 calculates a difference between a line integral output by the line integration unit 1031 and a line integral read from the memory 1032 that are at the same vertical position, to obtain a difference in line integral between frames. Here, a frame relating to the line integral output by the line integration unit 1031 is immediately previous to a frame relating to the line integral read from the memory 1032. Next, the normalization unit 1035 divides the difference in line integral between the frames by an average calculated by the average calculation unit 1034 that is a line integral from which the influence of flicker has been eliminated. As a result, the difference in line integral between the frames is normalized. This results in a normalized flicker component that has a constant amplitude and has no influence of the signal strength of a captured image, thereby facilitating analysis of flicker component.

The DFT unit 1036 performs a discrete Fourier transform on the normalized difference in line integral calculated by the normalization unit 1035, with respect to the number of lines per flicker cycle. For example, when the flicker frequency is 100 Hz and the frame rate is 60 fps and the number of lines per frame is N, the number of lines per flicker cycle is N·60/100.

The calculated Fourier coefficient gives an amplitude and a phase of flicker component for respective orders. The flicker coefficient calculation unit 1037 calculates a flicker coefficient for an input pixel value based on the amplitude and the phase. Lastly, the correction operation unit 1038 performs a flicker correction operation on the pixel value input to the flicker reduction unit 1021, using the flicker coefficient output by the flicker coefficient calculation unit 1037.

Citation List

[Patent Literature]
[Patent Literature 1] Japanese Patent Application Publication No. 2004-222228

SUMMARY OF INVENTION

Technical Problem

The following problems lie in the flicker reduction unit 1021 of the above imaging device 1000.

The average calculation unit 1034 needs to perform averaging processing so as to obtain a line integral from which influence of flicker has been eliminated, as described above. Specifically, the average calculation unit 1034 needs to calculate an average of the number of frames in which flicker component and a frame rate coincide in phase with each other. This number of frames is based on a frequency that is equivalent to the greatest common divisor of the flicker frequency and the frame rate. For example, when the flicker frequency is 100 Hz and the frame rate is 60 fps, a frequency that is equivalent to the greatest common divisor is 20 Hz and the number of frames is three at this time.

Here, considering that imaging is performed at a high frame rate, when the flicker frequency is 100 Hz and the frame rate is 240 fps for example, a frequency that is equivalent to the greatest common divisor is 20 Hz. However, the number of frames necessary for calculating an average is as many as 12. In this way, imaging at a high frame rate needs to storage of line integrals corresponding to a large number of frames depending on frame rate. This will necessitate an increased capacity of the memory 1032.

Furthermore, with the recent increase of the number of pixels in imaging devices, the number of horizontal lines of each frame increases, and the number of line integrals that need to be stored is likely to further increase. This will also necessitate an increased capacity of the memory 1032.

It is true that the above problem can be avoided by excluding a frame rate having an increased number of frames for averaging processing and using only a frame rate such as an integral multiple of 100 fps. However, this will result in less options of frame rate.

Also, it is true that an average can be calculated using only an appropriate number of frames. However, this is effective only when an amplitude of flicker component is sufficiently small with respect to a line integral. In the case where an imaging is performed at a high frame rate where an exposure time is short, an amplitude of flicker component tends to increase. Therefore, in such a case, it is unsuitable to employ the method of calculating an average using only an appropriate number of frames.

In view of the above problems, the present invention aims to provide a flicker reduction device, an integrated circuit, and a flicker reduction method that are capable of efficiently reducing flicker components from an image signal, with a small-capacity memory.

Solution to Problem

The flicker reduction device relating to the present invention is a flicker reduction device for reducing flicker components due to lighting that are contained in image signals imaged by imaging elements, the flicker reduction device comprising: an acquisition unit operable to acquire, for each screen, a sample line integral relating to each of at least one but not all of horizontal lines that constitute the screen, based on the image signals; a memory operable to store therein sample line integrals corresponding to a plurality of screens acquired by the acquisition unit; an inter-screen discrete Fourier transform unit operable to perform a discrete Fourier transform on a sample line integral sequence that is composed of (i) a sample line integral of one screen that has been most recently acquired by the acquisition unit and (ii) sample line integrals of a plurality of screens previous to the one screen that are stored in the memory; a flicker extraction unit operable to extract information of the flicker components based on a result of the discrete Fourier transform performed by the discrete Fourier transform; a flicker coefficient calculation unit operable to calculate a flicker coefficient for the image signals based on the information extracted by the flicker extraction unit; and a correction calculation unit operable to perform an operation for reducing the flicker components on the image signals based on the flicker coefficient calculated by the flicker coefficient calculation unit.

Also, the integrated circuit relating to the present invention is an integrated circuit for reducing flicker components due to lighting that are contained in image signals imaged by imaging elements, the integrated circuit comprising: an acquisition unit operable to acquire, for each screen, a sample line integral relating to each of at least one but not all of horizontal lines that constitute the screen, based on the image signals; a memory operable to store therein sample line integrals corresponding to a plurality of screens acquired by the acquisition unit; an inter-screen discrete Fourier transform unit operable to perform a discrete Fourier transform on a sample line integral sequence that is composed of (i) a sample line integral of one screen that has been most recently acquired by the acquisition unit and (ii) sample line integrals of a plurality of screens previous to the one screen that are stored in the memory; a flicker extraction unit operable to extract information of the flicker components based on a result of the discrete Fourier transform performed by the discrete Fourier transform; a flicker coefficient calculation unit operable to calculate a flicker coefficient for the image signals based on the information extracted by the flicker extraction unit; and a correction calculation unit operable to perform an operation for reducing the flicker components on the image signals based on the flicker coefficient calculated by the flicker coefficient calculation unit.

Furthermore, the flicker reduction method relating to the present invention is a flicker reduction method for reducing flicker components due to lighting that are contained in image signals imaged by imaging elements, the flicker reduction method comprising: an acquiring step of acquiring, for each screen, a sample line integral relating to each of at least one but not all of horizontal lines that constitute the screen, based on the image signals; a storing step of storing, in a memory, sample line integrals corresponding to a plurality of screens acquired in the acquiring step; an inter-screen discrete Fourier transforming step of performing a discrete Fourier transform on a sample line integral sequence that is composed of (i) a sample line integral of one screen that has been most recently acquired in the acquiring step and (ii) sample line integrals of a plurality of screens previous to the one screen that are stored in the memory; a flicker extracting step of extracting information of the flicker components based on a result of the discrete Fourier transform performed in the discrete Fourier transforming step; a flicker coefficient calculating step of calculating a flicker coefficient for the image signals based on the information extracted in the flicker extracting step; and a correction calculating step of performing an operation for reducing the flicker components on the image signals based on the flicker coefficient calculated in the flicker coefficient calculating step.

Advantageous Effects of Invention

According to the above flicker reduction device, integrated circuit, and flicker reduction method, even if a memory does not have a capacity to store a line integral relating to each of all of horizontal lines that constitute a screen, the memory only needs to have a capacity to store a line integral relating to each of at least one but not all of the horizontal lines that constitute the screen. Accordingly, it is effectively reduce flicker components contained in image signals with a small memory capacity.

In the above flicker reduction device, the acquisition unit may include: a line integration unit operable, for each of horizontal lines that constitute each screen, to perform integration on either all of image signals of the horizontal line or part of the image signals that satisfies a predetermined condition, and output, as a first line integral, either an integral resulting from the integration or a normalized integral obtained by normalizing the integral; and a sampling unit operable to sample, as the sample line integral, the first line integral relating to each of the at least one but not all of the horizontal lines among the first line integrals relating to the horizontal lines; the flicker reduction device may further comprise: an inter-line discrete Fourier transform unit operable to perform a discrete Fourier transform on a first line integral sequence that is composed of first line integrals relating to horizontal lines that constitute a screen, in a period based on a frequency of the flicker components included in the information; and a first flicker extraction unit operable to extract first information of the flicker components based on the result of the discrete Fourier transform, and the flicker coefficient calculation unit may perform the calculation based on the first information extracted by the first flicker extraction unit.

With this structure, the inter-line discrete Fourier transform unit and the first flicker extraction unit perform analysis on flicker components between horizontal lines, with use of the frequency of the flicker components extracted by the flicker extraction unit. This allows acquisition of first information of flicker components, which is more precise, thereby reducing flicker components more accurately.

In the above flicker reduction device, when a horizontal line that is a sample target relates to a first line integral having a value outside of a predetermined range, the sampling unit may change the sample target from the horizontal line to another horizontal line that relates to a first line integral having a value within the predetermined range.

With this structure, the inter-screen discrete Fourier transform unit and the flicker extraction unit each perform processing with use of a horizontal line relating to a first line integral having a value within a predetermined range. This can avoid inclusion of an error in image signals on which processing of reducing flicker component is to be performed, thereby reducing flicker components with a higher accuracy.

In the above flicker reduction device, the sampling unit may determine a horizontal line as a sample target based on a motion vector in image block between screens.

With this structure, a horizontal line as a sample target is determined in consideration of a motion in screen block between screens. This allows reduction of flicker components with a higher accuracy.

In the above flicker reduction device, the inter-screen discrete Fourier transform unit may estimate a frequency at which the flicker components have a possibility to be detected based on a commercial power frequency and a frame rate relating to the image signals, and may perform the discrete Fourier transform on the sample line integral sequence based on the estimated frequency.

With this structure, a frequency at which flicker component will possibly be detected is estimated based on the commercial power frequency and the frame rate. The inter-screen discrete Fourier transform unit only needs to calculate only Fourier coefficients one-to-one corresponding to frequencies including the estimated frequency and a frequency adjacent to the estimated frequency. This can reduce an amount of a discrete Fourier transform operation performed by the inter-screen discrete Fourier transform unit.

DESCRIPTION OF EMBODIMENTS

The following describes embodiments of the present invention with reference to the drawings. In the descriptions, a term "screen" means frame or field, for example. Flicker reduction units shown below each perform processing on the basis of frames. Alternatively, the processing may be performed on the basis of fields.

<First Embodiment>

The following describes a first embodiment of the present invention with reference to the drawings.

<Structure and Operations of Imaging Device 10>

Figure 1:
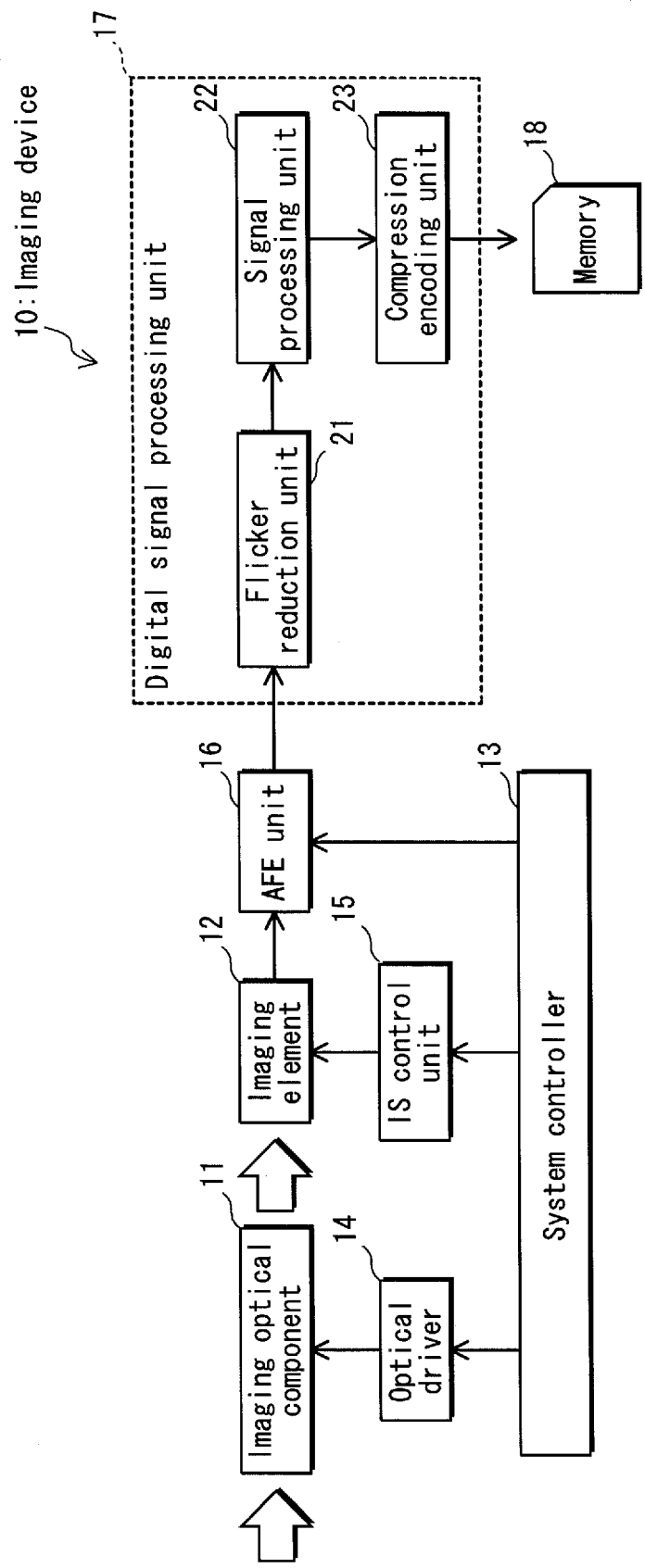
FIG. 1 is a block diagram showing a structural example of an imaging device including a flicker reduction unit relating to a first embodiment.

FIG. 1 is a block diagram showing a structural example of an imaging device 10 including a flicker reduction unit 21 relating to the first embodiment. The imaging device 10 images a subject by an area image sensor to generate an image, and performs digital signal processing on the generated image for output or records therein the generated image. The imaging device 10 is a digital video camera, a digital still camera, or the like.

The imaging device 10 includes, as shown in FIG. 1, an imaging optical component 11, an imaging element 12, a system controller 13, an optical driver 14, an IS control unit 15, an AFE unit 16, and a digital signal processing unit 17.

The imaging optical component 11 is composed of a lens, a diaphragm, and so on. The imaging element 12 is an area image sensor that converts light, which is formed as an image on an imaging surface, into an analog image signal that is an electrical signal, and outputs the analog image signal to the AFE unit 16. The imaging element 12 is for imaging by line exposure, and is for example a CMOS (Complementary Metal Oxide Semiconductor) image sensor. Note that line exposure is also referred to as rolling shutter. The imaging optical component 11 adjusts an amount of light from a subject by the diaphragm, and forms an image of the subject on the imaging surface of the imaging element 12.

The system controller 13 is composed of a microprocessor and so on, and controls the whole imaging device 10. The optical driver 14 adjusts a zoom, a focal point, the diaphragm, and so on of the imaging optical component 11, in accordance with an instruction issued by the system controller 13. The IS control unit 15 controls the imaging element 12 in accordance with an instruction issued by the system controller 13.

The AFE unit 16 performs, under control of the system controller 13, analog signal processing on the analog image signal output by the imaging element 12, and outputs a digital image signal resulting from the analog signal processing. The AFE unit 16 is composed of a sample hold circuit, an AGC (automatic gain controller), an ADC (analog-to-digital converter), and so on. The sample hold circuit samples, under control of the system controller 13, an analog image signal, and holds the sampled analog image signal for a predetermined time period. The AGC performs, under control of the system controller 13, gain adjustment on the analog image signal output by the sample hold circuit. The ADC converts the analog signal image, on which gain adjustment has been performed by the automatic gain controller, into a digital signal for output.

The digital signal processing unit 17 performs digital signal processing on the digital image signal output by the AFE unit 16 to generate an image signal for output from the imaging device 10. The digital signal processing unit 17 is composed of, as shown in FIG. 1, a flicker reduction unit 21, a signal processing unit 22, and a compression encoding unit 23. The flicker reduction unit 21 reduces flicker component contained in the digital image signal output by the AFE unit 16. When imaging is performed under lighting flicking by an alternating-current lighting such as a fluorescent lighting, flicker appears on a generated image as a phenomenon of increase and decrease in brightness. The flicker reduction unit 21 is described in detail later. The signal processing unit 22 performs white balance adjustment, gamma adjustment, image format conversion in accordance with an output image format, and so on, on the digital image signal on which flicker component reduction processing has been performed by the flicker reduction unit 21. The compression encoding unit 23 encodes the digital image signal on which the above processing has been performed by the signal processing unit 22, in accordance with an image compression encoding standard such as JPEG (Joint Photographic Experts Group) and MPEG (Moving Picture Experts Group).

According to the imaging device 10 having the above structure, the blocks each perform the functions as described above. The imaging optical component 11 forms an image of light from a subject on the imaging surface of the imaging element 12. The imaging element 12 performs photoelectric conversion on the formed image to generate an analog image signal. Next, the AFE unit 16 performs analog signal processing on the analog image single output by the imaging element 12 to generate a digital image signal. The digital signal processing unit 17 performs, on the digital image signal output by the AFE unit 16, digital signal processing such as flicker reduction processing, white balance adjustment, gamma adjustment, image format conversion, and compression encoding. The signal on which the digital signal processing has been performed by the digital signal processing unit 17 is output as an output image signal of the imaging device 10. The image signal output by the digital signal processing unit 17 is stored in a memory 18 for example.

<Structure of Flicker Reduction Unit 21>

Figure 2:
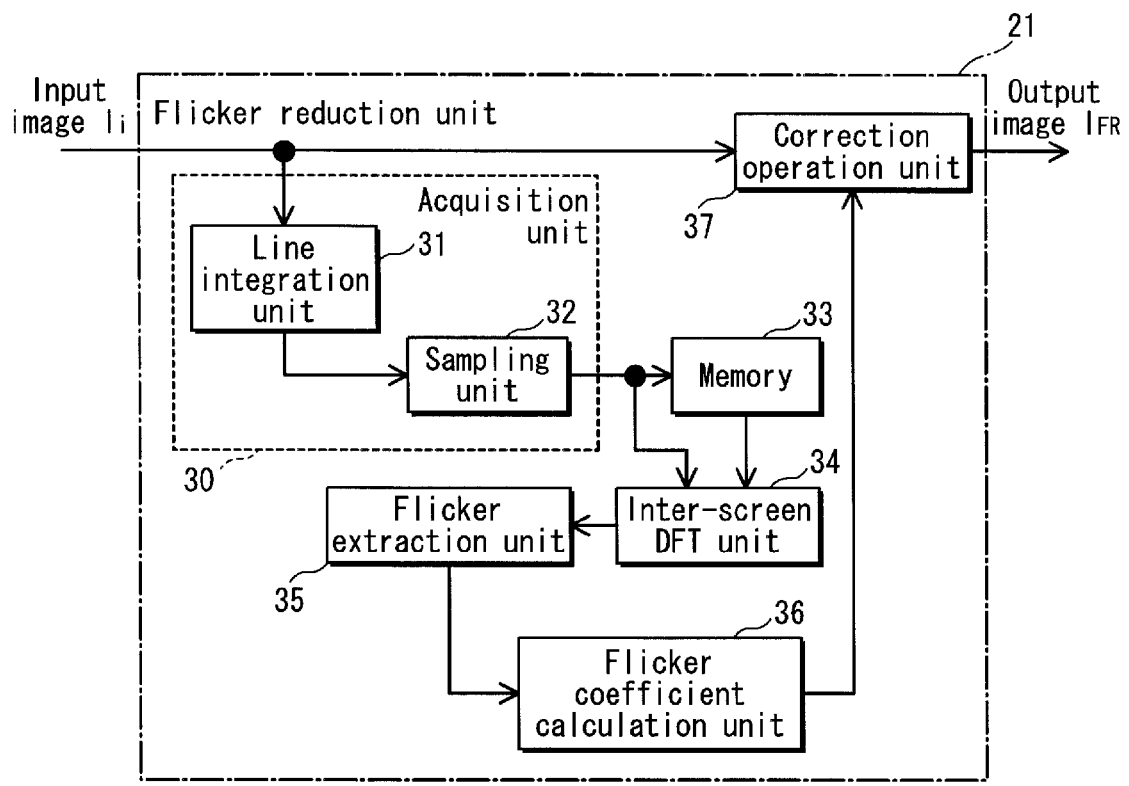
FIG. 2 is a block diagram showing a structural example of the flicker reduction unit shown in FIG. 1.

FIG. 2 is a block diagram showing a structural example of the flicker reduction unit 21 shown in FIG. 1. The flicker reduction unit 21 includes, as shown in FIG. 2, an acquisition unit 30 which is composed of a line integration unit 31 and a sampling unit 32, a memory 33, an inter-screen DFT (Discrete Fourier Transform) unit 34, a flicker extraction unit 35, a flicker coefficient calculation unit 36, and a correction operation unit 37.

The line integration unit 31 receives input of a digital image signal output by the AFE unit 16, which is referred to as "input image $I_i$" here and FIG. 2. The line integration unit 31 performs, for each frame, integration on all digital image signals of each of all horizontal lines that constitute the frame, namely, all digital image signals of each of a plurality of horizontal lines, to obtain an integral (hereinafter "line integral"). Then, the line integration unit 31 outputs the line integral to the sampling unit 32, as a first line integral.

The sampling unit 32 samples, as second line integrals (equivalent to "sample line integrals"), a first line integral relating to each of at least one but not all of the plurality of horizontal lines output for each frame by the line integration unit 31, in accordance with a plurality of selection line numbers (vertical coordinates) representing horizontal lines that are sample targets. Then, the sampling unit 32 outputs the sampled second line integrals to the inter-screen DFT unit 34, and also stores the second line integrals in the memory 33.

The memory 33 stores therein the second line integrals sampled by the sampling unit 32 corresponding in number to a plurality of frames. In the case where the flicker reduction unit 21 performs processing on the basis of fields, the memory 33 stores therein the second line integrals sampled by the sampling unit 32 so as to correspond in number to a plurality of fields.

The inter-screen DFT unit 34 selects the most appropriate one among the plurality of horizontal lines relating to the second line integrals sampled by the sampling unit 32. Then, the inter-screen DFT unit 34 performs a discrete Fourier transform on a second line integral sequence (equivalent to "sample line integral sequence"). The second line integral sequence is composed of (i) a second line integral of a certain frame that has been most recently sampled by the sampling unit 32 and (ii) second line integrals of a plurality of frames previous to the certain frame and that are read from the memory 33. The most recently acquired second line integral and the read second line integrals relate to horizontal lines that have the same selection line number in the respective frames. Here, the lines having the same selection line number means that the lines are located at the same vertical coordinate. The second line integral sequence here is composed of second line integrals that are arranged in time series.

The flicker extraction unit 35 extracts information of flicker component (frequency, phase, and amplitude ratio) from a Fourier coefficient resulting from the discrete Fourier transform performed by the inter-screen DFT unit 34. Then, the flicker extraction unit 35 outputs the extracted information of flicker component (frequency, phase, and amplitude ratio) to the flicker coefficient calculation unit 36.

The flicker coefficient calculation unit 36 calculates a flicker coefficient corresponding to an input image I, that is currently input to the flicker reduction unit 21, based on the information of flicker component (frequency, phase, and amplitude ratio) output by the flicker extraction unit 35.

The correction operation unit 37 performs a flicker reduction operation that is an operation for reducing flicker component on the input image $I_i$ output by the AFE unit 16, based on the flicker coefficient output by the flicker coefficient calculation unit 36, to reduce the flicker component contained in the input image $I_i$. Then, the correction operation unit 37 outputs a digital image signal resulting from the flicker reduction operation, which is referred to as "output image $I_{FR}$" in FIG. 2, to the signal processing unit 22. Specifically, the correction operation unit 37 divides the input image $I_i$ by a value, which is obtained by adding 1 to the flicker coefficient, to reduce the flicker component contained in the input image $I_i$.

<Operations of Sampling Unit 32 and Inter-screen DFT Unit 34>

The following describes operations of the sampling unit 32 and the inter-screen DFT unit 34 shown in FIG. 2.

Figure 3:
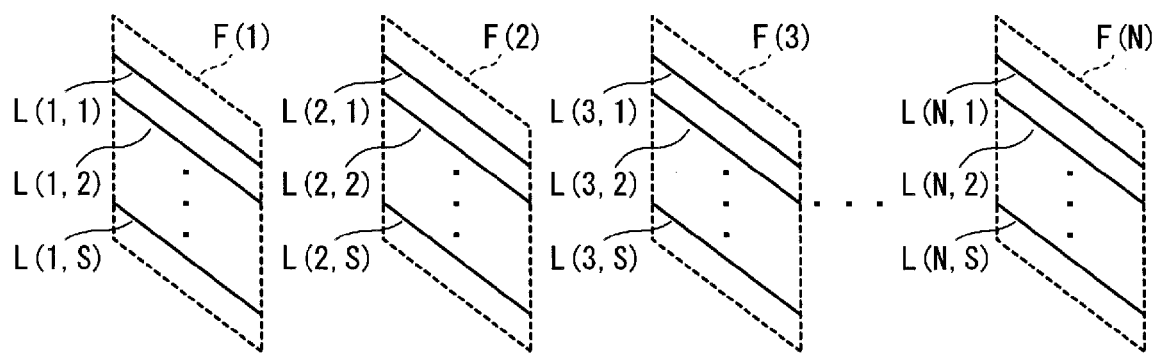
FIG. 3 shows schematic operations of a sampling unit 32 shown in FIG. 2.

FIG. 3 shows schematic operations of the sampling unit 32 shown in FIG. 2. In FIG. 3, the expressions F(1), F(2), F(3), . . . , F(N) each show a frame. The value "n" of the expression "F(n)" represents a frame number. When n=1, 2, 3, . . . , N is satisfied, L(n,1), L(n,2), . . . , L(n,S) each represent S horizontal lines that are sample targets each relating to a second line integral that is to be sampled by the sampling unit 32. Note that the values "n" and "s" of the expression L(n,s) represent a frame number and a selection line number of a horizontal line that is a sample target, respectively. Here, the value "S", which represents the number of horizontal lines that are sample targets, is less than the total number of horizontal lines constituting each frame. Horizontal lines having the same selection line number such as L(1,1), L(2,1), L(3,1), . . . , L(N,1) are positioned at the same vertical coordinate of respective frames.

Here, the inter-screen DFT unit 34 performs a discrete Fourier transform on N second line integrals. The following description relates to the operations of the sampling unit 32 and the inter-screen DFT unit 34 upon input of a frame F(N) to the flicker reduction unit 21.

When the frame F(N) is input to the flicker reduction unit 21, the memory 33 stores therein second line integrals relating to horizontal lines one-to-one corresponding to line numbers 0, 1, 2, . . . , S, with respect to frames F(1) to F(N−1).

With respect to the frame F(N), the sampling unit 32 samples, as second line integrals, first line integrals of horizontal lines one-to-one corresponding to the line numbers 1, 2, 3, . . . , S, among a plurality of horizontal lines output by the line integration unit 31.

The inter-screen DFT unit 34 selects the most appropriate one among the horizontal lines relating to the second line integrals sampled by the sampling unit 32. Then, the inter-screen DFT unit 34 performs a discrete Fourier transform on a second line integral sequence which is composed of, with respect to the selected horizontal line, the second line integrals of the frame F(N) sampled by the sampling unit 32 and second line integrals of the frame F(1) to F(N−1) stored in the memory 33. The most appropriate horizontal line is, for example, a horizontal line that has the largest second line integral within a predetermine range (such as a range of the upper limit or less). The most appropriate horizontal line is not limited to this.

The sampling unit 32 stores, in the memory 33, the sampled second line integrals of the horizontal lines one-to-one corresponding to the selection line numbers 1, 2, 3, . . . , S with respect to the frame F(N). The number of frames relating to the second line integrals to be stored in the memory 33 is predetermined in consideration of the capacity of the memory 33. Second line integrals stored in the memory 33 are deleted beginning with one relating to the oldest frame.

Here, the following describes the value "S" representing the number of horizontal lines that are sample targets. In the case where there is no change in a subject image and accordingly sufficient brightness is obtained, it is possible to extract flicker component using only one horizontal line as a sample target (S=1). However, under actual imaging circumstances, a frame might include a horizontal line inappropriate for extraction of flicker component. Such actual imaging circumstances include the case where there is a change in a subject image, the case where a digital image signal has a low brightness and accordingly has a low SN ratio (Signal-to Noise Ratio), the case where a digital image signal having an excessive high brightness causes saturation and results in a distorted waveform, and so on. In view of the circumstances, the sampling unit 32 samples second line integrals relating to a plurality of horizontal lines of respective frames, and the inter-screen DFT unit 34 selects a more appropriate horizontal line to perform a discrete Fourier transform.

Alternatively, the following structure may be employed. The number of horizontal lines S as sample target is determined as 1. The sampling unit 32 samples, as a second line integral, a first line integral relating to a predetermined one of horizontal lines constituting a frame for example. The inter-screen DFT unit 34 performs a discrete Fourier transform on a second line integral sequence composed of second line integrals relating to horizontal lines of several frames that are at the same vertical position as the predetermined horizontal line.

<Operations of Flicker Extraction Unit 35 and Flicker Coefficient Calculation Unit 36>

The following describes operations of the flicker extraction unit 35 and the flicker coefficient calculation unit 36 shown in FIG. 2.

When the frame rate is 240 fps (frame per second), a frequency of flicker component of 100 Hz is half the frame rate or lower, namely, the Nyquist frequency or lower. Here, the flicker component shows its peak at a Fourier coefficient corresponding to the frequency of 100 Hz resulting from the discrete Fourier transform performed by the inter-screen DFT unit 34. Note that a Fourier coefficient corresponding to a DC (Direct Current: frequency of 0) is due to the original image component.

The above peak detection can be performed by comparing with the Fourier coefficient corresponding to the DC due to the original image component and judging whether a peak is shown. Specifically, a predetermined proportion is determined based on a ratio of the lowest detectable flicker component to the intensity of the original image component. Based on the Fourier coefficient output by the inter-screen DFT unit 34, the flicker extraction unit 35 searches Fourier coefficients corresponding to frequencies at which flicker component can probably be contained for a Fourier coefficient that exceeds the predetermined proportion with respect to the Fourier coefficient corresponding to the DC. When finding the Fourier coefficient, the flicker extraction unit 35 judges that flicker component is contained at a frequency corresponding to the found Fourier coefficient.

When there is an extremely small change in image between frames of a horizontal line on which a discrete Fourier transform is to be performed, an obtained Fourier coefficient corresponds to a prominent peak at the DC. When there is a change in image caused by a motion of a subject, blurring due to a motion of the imaging device, or the like, the peak decreases in position and increases in width depending on the degree of change. In view of this, the inter-screen DFT unit 34 may perform a discrete Fourier transform on each of a plurality of horizontal lines relating to second line integrals that fall within a predetermined range (no over-exposure and no under-exposure). The flicker extraction unit 35 may preferentially adopt a Fourier coefficient of a horizontal line having a prominent peak to extract flicker component. In this way, even when there is a change in image due to a motion of a subject, blurring due to a motion of the imaging device, or the like, it is possible to extract flicker component more stably.

The flicker extraction unit 35 performs the above processing to specify a frequency at which flicker component is contained. Then, the flicker extraction unit 35 calculates an amplitude and a phase of the flicker component, based on a magnitude and an argument of a Fourier coefficient that is a complex number, which corresponds to the frequency specified that the flicker component is contained. The flicker extraction unit 35 calculates a amplitude ratio of the calculated amplitude of the flicker component to an amplitude of a Fourier coefficient corresponding to the DC. Then, the flicker extraction unit 35 outputs information of the flicker component (frequency, phase, and amplitude ratio) to the flicker coefficient calculation unit 36.

The flicker coefficient calculation unit 36 assigns the frequency, the phase, the amplitude ratio of the flicker component output by the flicker extraction unit 35 to a frequency f, a phase θ, an amplitude A of a wave equation of Aexp{j(2πft+θ)} for example, respectively, to obtain a current value of the wave as a flicker coefficient. The flicker coefficient represents the ratio of increase and decrease of digital image signals due to flicker component to the original digital image signals. Note that the signs "t" and "j" of the above wave equation represent an imaging time of a sample target line and an imaginary, respectively.

Also, unlike when the frame rate is 240 fps, when the frame rate is 120 fps, the frequency of flicker component of 100 Hz is higher than half the frame rate and is higher than the Nyquist frequency. Accordingly, a result of the discrete Fourier transform performed by the inter-screen DFT unit 34 shows a peak due to flicker component at a Fourier coefficient corresponding to a frequency 20 Hz because of a folding at the Nyquist frequency. In this case, it is impossible to determine which of frequencies of 20 Hz, 100 Hz, 140 Hz, . . . the frequency of the flicker component is. However, since flickering at 60 Hz or lower is inappropriate for practical lighting, the flicker component cannot be detected at 20 Hz. Accordingly, a frequency to be analyzed by the flicker extraction unit 35 is 100 Hz or higher. Except for this point, the operations are performed in substantially the same way as in the a case where a commercial power frequency is 50 Hz and a frame rate is 240 fps.

Note that the above values of the frequency relating to flicker component and the frame rate are just examples, and are not limited to these examples.

<Operations of Flicker Reduction Unit 21>

Figure 4:
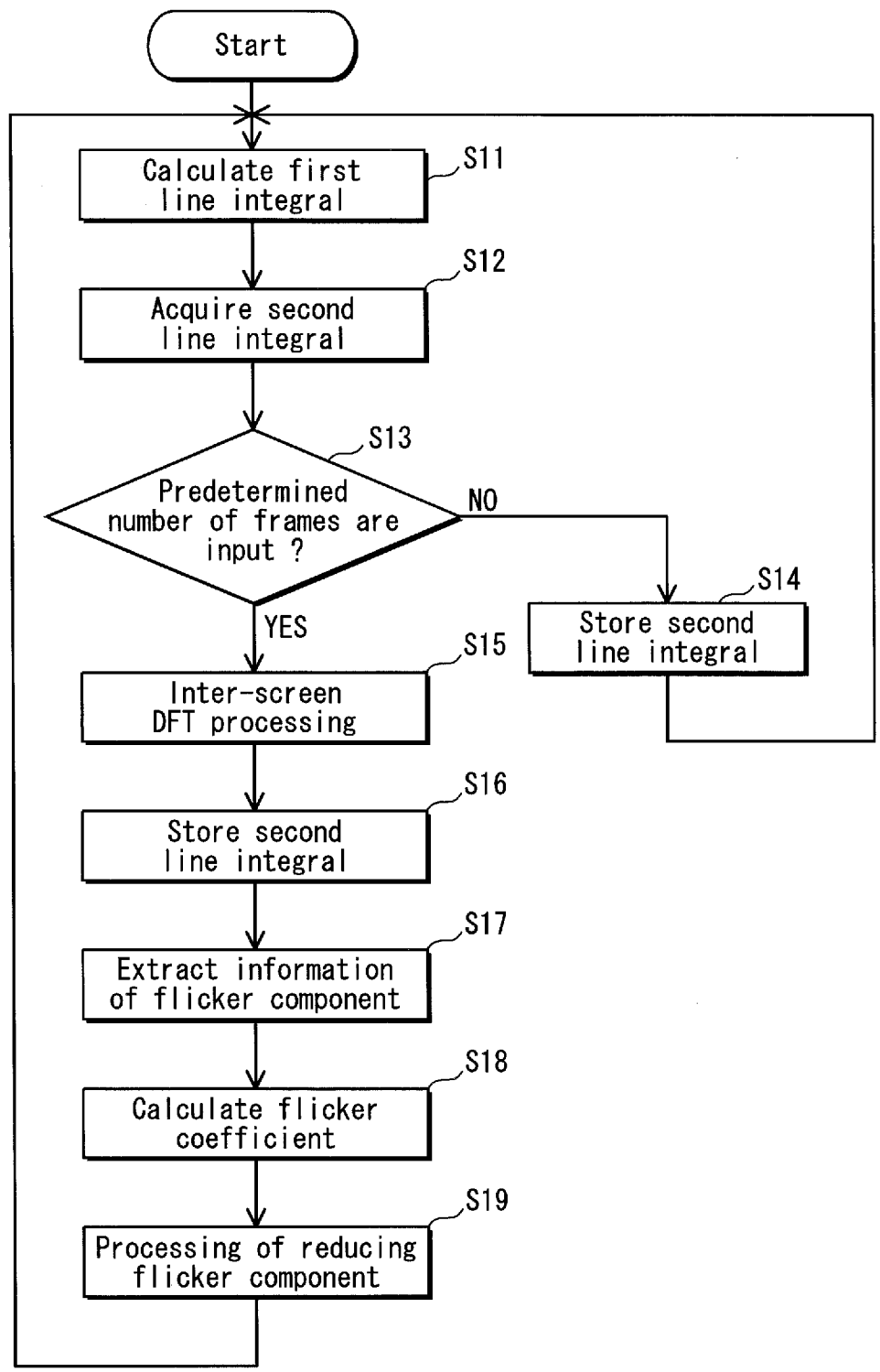
FIG. 4 is a flow chart of flicker reduction processing performed by the flicker reduction unit shown in FIG. 2.

FIG. 4 is a flow chart of flicker reduction processing performed by the flicker reduction unit 21 shown in FIG. 2.

With respect to a frame corresponding to digital image signals input to the flicker reduction unit 21, the line integration unit 31 calculates a first line integral for each of all the horizontal lines (a plurality of horizontal lines) that constitute the frame (Step S11). The sampling unit 32 samples second line integrals from the first line integrals output by the line integration unit 31 (Step S12).

The inter-screen DFT unit 34 judges whether a predetermined number of frames, which are necessary for the inter-screen DFT unit 34 to perform a discrete Fourier transform, are input to the flicker reduction unit 21 (Step S13). If judging negatively (Step S13: No), the inter-screen DFT unit 34 does not perform a discrete Fourier transform, and the sampling unit 32 stores the second line integrals sampled in Step S12 in the memory 33 (Step S14).

On the other hand, if judging affirmatively (Step S13: Yes), the inter-screen DFT unit 34 performs a discrete Fourier transform on a second line integral sequence, which is composed of the second line integral sampled in Step S12 and second line integrals read from the memory 33 relating to horizontal lines of several frames having the same selection line number (at the same vertical position) as the horizontal line relating to the acquired second line integral (Step S15). The sampling unit 32 stores the second line integrals sampled in Step S12 in the memory 33 (Step S16).

The flicker extraction unit 35 extracts information of flicker component (frequency, phase, and amplitude ratio) from a Fourier coefficient resulting from the discrete Fourier transform performed by the inter-screen DFT unit 34 (Step S17). The flicker coefficient calculation unit 36 calculates a flicker coefficient corresponding to digital image signals of a frame that is currently input to the flicker reduction unit 21, based on the information of the flicker component (frequency, phase, and amplitude ratio) output by the flicker extraction unit 35 (Step S18). The correction operation unit 37 performs an operation for reducing the flicker component on the digital image signals, based on the flicker coefficient calculated in Step S18 (Step S19).

According to the flicker reduction unit 21 of the imaging device 10 relating to the first embodiment as described above, even in the case where line integrals among a large number of frames such as the case where capturing is performed at a high frame rate, it is unnecessary to store, in the memory 33, it is unnecessary store second line integrals relating to all horizontal lines constituting the frames in the memory 33. This can reduce the capacity of the memory 33. As a result, the flicker reduction unit 21 can reduce flicker component with an appropriate accuracy, with use of the memory 33 having a comparatively small capacity.

<Second Embodiment>

The following describes a second embodiment of the present invention with reference to the drawings. A flicker reduction unit 21a relating to the second embodiment analyzes flicker component at a higher sampling frequency than the flicker reduction unit 21 relating to the first embodiment.

An imaging device relating to the second embodiment has substantially the same compositional elements as that relating to the first embodiment, except the flicker reduction unit 21a. Accordingly in the second embodiment, description is given with respect to the flicker reduction unit 21a. Note that the compositional elements relating to the second embodiment that are the same as those relating to the first embodiment have the same reference numbers. The description given in the first embodiment is applicable to the second embodiment, and accordingly the description is omitted or briefly given in the second embodiment.

<Structure of Flicker Reduction Unit 21a>

Figure 5:
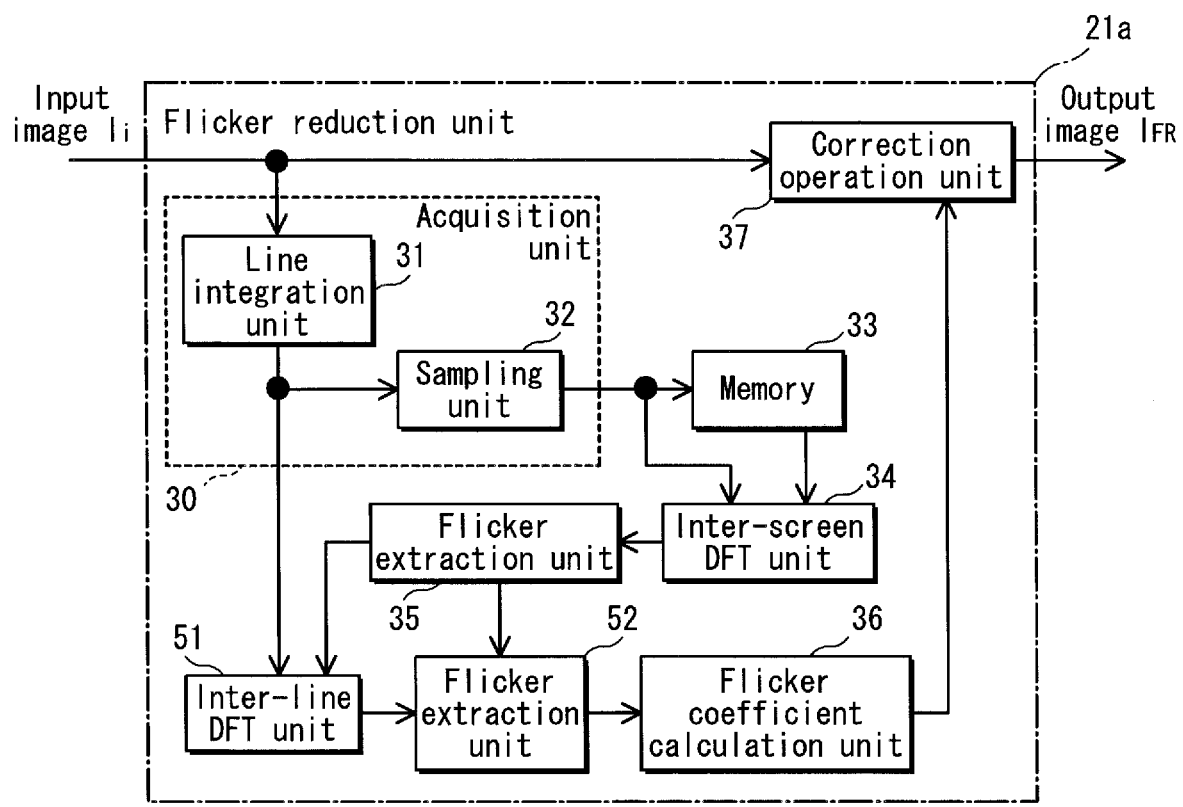
FIG. 5 is a block diagram showing a structural example of a flicker reduction unit relating to a second embodiment.

FIG. 5 is a block diagram showing a structural example of the flicker reduction unit 21a relating to the second embodiment.

The flicker reduction unit 21a includes an acquisition unit 30 which is composed of a line integration unit 31 and a sampling unit 32, a memory 33, an inter-screen DFT unit 34, a flicker extraction unit 35, an inter-line DFT unit 51, a flicker extraction unit 52, a flicker coefficient calculation unit 36, and a correction operation unit 37. Note that the line integration unit 31 outputs the first line integral to not only the sampling unit 32 but also to the inter-line DFT unit 51. Also, the flicker extraction unit 35 outputs information of flicker component (frequency, phase, and amplitude ratio) to the inter-line DFT unit 51 and the flicker extraction unit 52, instead of to the flicker coefficient calculation unit 36.

The inter-line DFT unit 51 receives the information of the flicker component (frequency, phase, and amplitude ratio) from the flicker extraction unit 35. In at least one cycle based on the received frequency of the flicker component, the inter-line DFT unit 51 performs a discrete Fourier transform on a first line integral sequence that is composed of first line integrals relating to horizontal lines constituting the same frame output by the line integration unit 31. The first line integral sequence here is composed of first line integrals that are arranged in time series. Note that a time interval between first line integrals on which a discrete Fourier transform is performed by the inter-line DFT unit 51 is shorter than a time interval between second line integrals on which a discrete Fourier transform is performed by the inter-screen DFT unit 34.

The flicker extraction unit 52 extracts first information of the flicker component (frequency, phase, and amplitude ratio), which is more precise, from a Fourier coefficient resulting from the discrete Fourier transform performed by the inter-line DFT unit 51. Then, the flicker extraction unit 52 outputs the extracted first information of the flicker component (frequency, phase, and amplitude ratio) to the flicker coefficient calculation unit 36. Not that when the flicker extraction unit 52 cannot detect the flicker component contained in a Fourier coefficient resulting from the discrete Fourier transform performed by the inter-line DFT unit 51, the flicker extraction unit 52 outputs, as first information of the flicker component (frequency, phase, and amplitude ratio), the information of the flicker component (frequency, phase, and amplitude ratio) output by the flicker extraction unit 35, to the flicker coefficient calculation unit 36. Except for using the Fourier coefficient output by the inter-line DFT unit 51 instead of the Fourier coefficient output by the inter-screen DFT unit 34, the flicker extraction unit 52 performs flicker extraction processing that is substantially the same as that performed by the flicker extraction unit 35, to extract first information of the flicker component (frequency, phase, and amplitude ratio) from the Fourier coefficient output by the inter-line DFT unit 51.

In the first embodiment, the flicker coefficient calculation unit 36 performs flicker coefficient calculation based on information of flicker component (frequency, phase, and amplitude ratio) output by the flicker extraction unit 35. Compared with this, in the second embodiment, the flicker coefficient calculation unit 36 performs flicker coefficient calculation based on first information of flicker component (frequency, phase, and amplitude ratio) output by the flicker extraction unit 52.

<Operations of Inter-line DFT Unit 51 and Flicker Extraction Unit 52>

The following describes operations of the inter-line DFT unit 51 and the flicker extraction unit 52 shown in FIG. 5. Operations performed by other compositional elements are simply described as necessary.

When the frame rate is for example 240 fps, a frequency of flicker component of 100 Hz is half the frame rate or lower, namely, the Nyquist frequency or lower. Here, the flicker component shows its peak at a Fourier coefficient corresponding to the frequency of 100 Hz resulting from the discrete Fourier transform performed by the inter-screen DFT unit 34. Note that a Fourier coefficient corresponding to the DC is due to the original image component.

The flicker extraction unit 35 extracts information of the flicker component (frequency, phase, and amplitude ratio) from a Fourier coefficient resulting from the discrete Fourier transform performed by the inter-screen DFT unit 34, in the way described in the first embodiment.

Here, in consideration of aliasing, there is a possibility that the peak at 100 Hz corresponds to the flicker component of 140 Hz. In order to perform analysis at a higher sampling frequency to detect such a possibility, the inter-line DFT unit 51 performs waveform analysis in units of lines.

In a time period based on the frequency relating to the flicker component extracted by the flicker extraction unit 35, the inter-line DFT unit 51 performs a discrete Fourier transform on a first line integral sequence that is composed of first line integrals relating to horizontal lines constituting the same frame. Here, the inter-line DFT unit 51 calculates, as a Fourier coefficient for the first line integral sequence, only Fourier coefficients one-to-one corresponding to frequencies including a frequency at which flicker component can possibly be detected and an adjacent frequency, based on the information of the flicker component extracted by the flicker extraction unit 35. As a result, the inter-line DFT unit 51 does not need to calculate a Fourier coefficient for all frequencies. This can reduce an amount of discrete Fourier transform calculation performed by the inter-line DFT unit 51, and accordingly can reduce power consumption.

The flicker extraction unit 52 performs flicker extraction processing with use of the Fourier coefficient resulting from the discrete Fourier transform performed by the inter-line DFT unit 51, and outputs final first information of the flicker component (frequency, phase, and amplitude ratio) to the flicker coefficient calculation unit 36. Specifically, a predetermined proportion is determined based on a ratio of the lowest detectable flicker component to the intensity of the original image component. Based on the Fourier coefficient output by the inter-screen DFT unit 34, the flicker extraction unit 52 searches Fourier coefficients output by the inter-line DFT unit 51 for a Fourier coefficient that exceeds the predetermined proportion with respect to the Fourier coefficient corresponding to the DC. When finding the Fourier coefficient, the flicker extraction unit 52 judges that flicker component is contained at a frequency corresponding to the found frequency.

In this way, the flicker extraction unit 52 specifies a frequency at which flicker component is contained. Then, the flicker extraction unit 52 calculates an amplitude and a phase of the flicker component, based on a magnitude and an argument of a Fourier coefficient that is a complex number, which corresponds to the frequency specified that the flicker component is contained. The flicker extraction unit 35 calculates a amplitude ratio of the calculated amplitude of the flicker component to an amplitude of a Fourier coefficient corresponding to the DC. Then, the flicker extraction unit 52 outputs first information of the flicker component (frequency, phase, and amplitude ratio) to the flicker coefficient calculation unit 36.

Note that the above values of the frequency relating to flicker component and the frame rate are just examples, and are not limited to these examples.

<Operations of Flicker Reduction Unit 21*a*>

Figure 6:
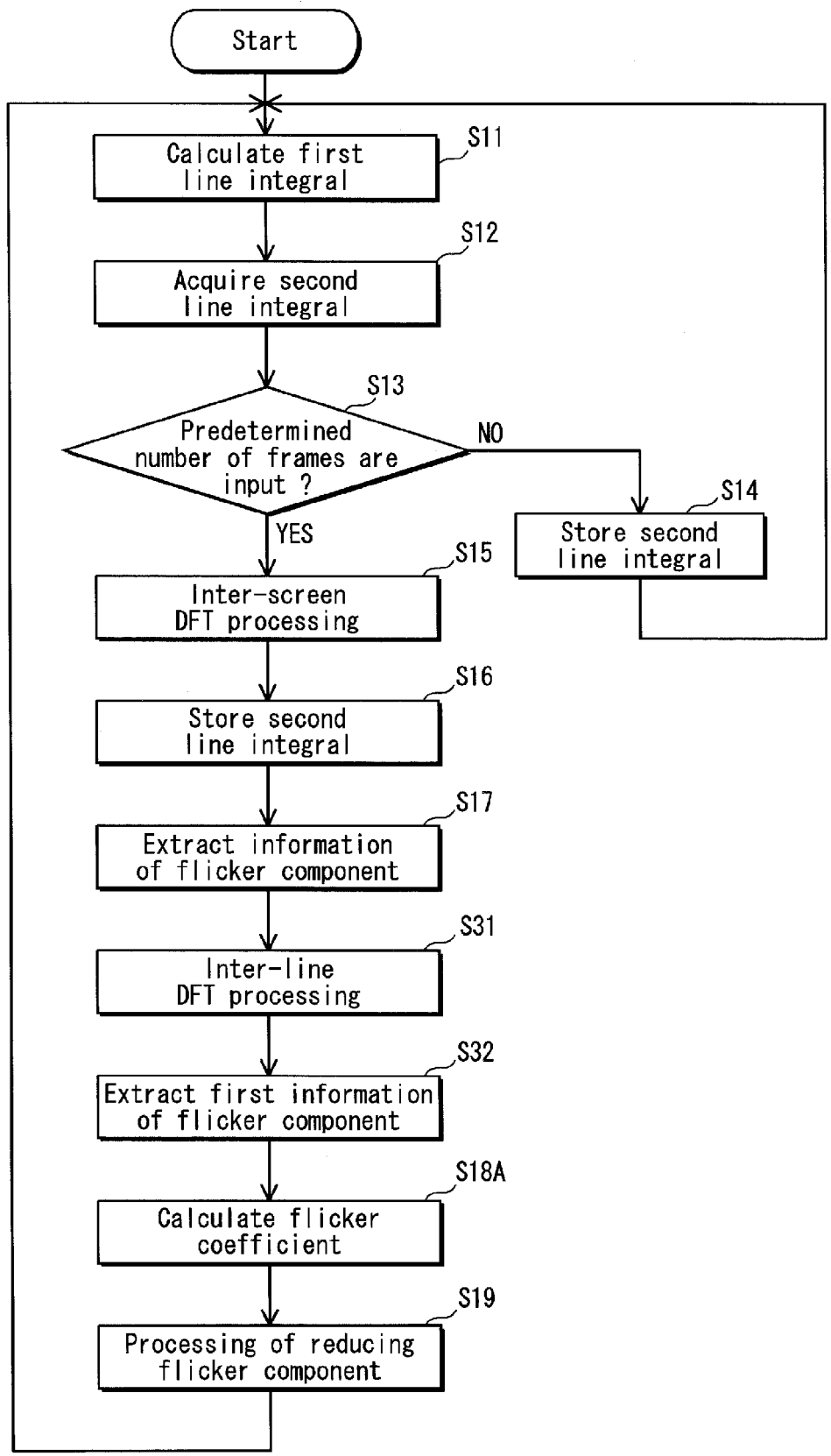
FIG. 6 is a flow chart of flicker reduction processing performed by the flicker reduction unit shown in FIG. 5.

FIG. 6 is a flow chart of flicker reduction processing performed by the flicker reduction unit 21*a* shown in FIG. 5.

The line integration unit 31, the sampling unit 32, the inter-screen DFT unit 34, the flicker extraction unit 35 perform processing of Steps S11 to S17 described in the first embodiment.

In at least one cycle based on the frequency relating to the flicker component extracted by the flicker extraction unit 35, the inter-line DFT unit 51 performs a discrete Fourier transform on a first line integral sequence that is composed of first line integrals output by the line integration unit 31. The extraction unit 52 extracts first information of the flicker component (frequency, phase, and amplitude ratio), which is more precise, from a Fourier coefficient resulting from the discrete Fourier transform performed by the inter-line DFT unit 51 (Step S32). The flicker coefficient calculation unit 36 calculates a flicker coefficient corresponding to digital image signals of a frame that is currently input to the flicker reduction unit 21*a*, based on the first information of the flicker component (frequency, phase, and amplitude ratio) output by the flicker extraction unit 52 (Step S18A). The correction operation unit 37 performs an operation for reducing the flicker component on the digital image signals, based on the flicker coefficient calculated in Step S18A (Step S19).

The flicker reduction unit 21*a* of the imaging device relating to the second embodiment exhibits the effects of the flicker reduction unit 21 relating to the first embodiment. Furthermore, by including the inter-line DFT unit 51 and the flicker extraction unit 52, the flicker reduction unit 21*a* can calculates a frequency, a phase, and an amplitude ratio of flicker component. This can reduce the flicker component contained in digital image signals more accurately.

<Third Embodiment>

The following describes a third embodiment of the present invention with reference to the drawings. A flicker reduction unit 21*b* relating to the third embodiment has the functions of the flicker reduction unit 21*a* relating to the second embodiment. Additionally, the flicker reduction unit 21*b* has a function of determining a horizontal line from which a second line integral is to be sampled by a sampling unit 32*b* based on a result of detection performed by an MV unit (motion vector detection unit) 71 of a compression encoding unit 22*b*.

An imaging device relating to the third embodiment has substantially the same compositional elements as that relating to the first or second embodiment, except a digital signal processing unit 17*b*. Accordingly in the third embodiment, description is given with respect to the digital signal processing unit 17*b*. Note that the compositional elements relating to the third embodiment that are the same as those relating to the first or second embodiment have the same reference numbers. The description given in the first embodiment is applicable to the second embodiment, and accordingly the description is omitted or briefly given in the third embodiment.

<Digital Signal Processing Unit>

Figure 7:
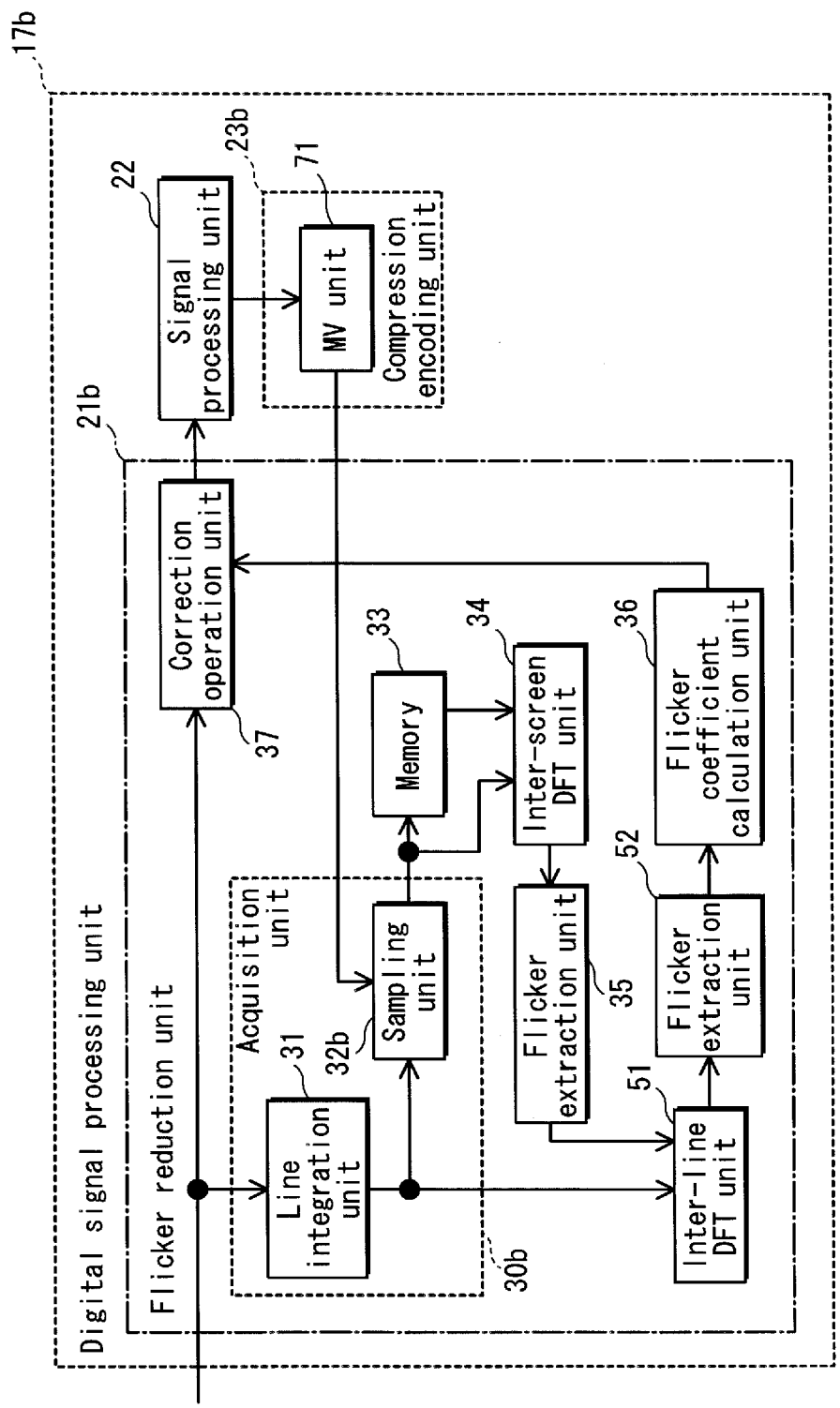
FIG. 7 is a block diagram showing a structural example of a digital signal processing unit relating to a third embodiment.
Figure 8:
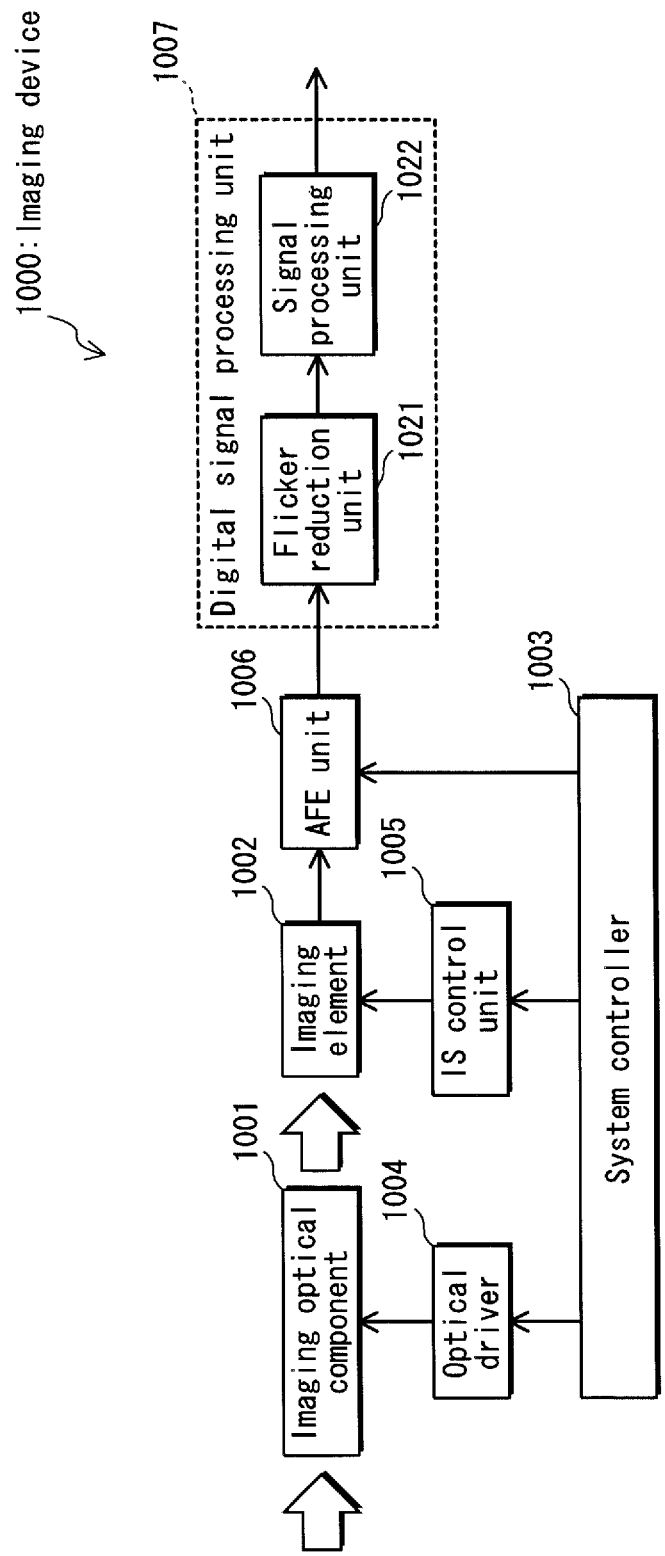
FIG. 8 is a block diagram showing a structure of a conventional imaging device.
Figure 9:
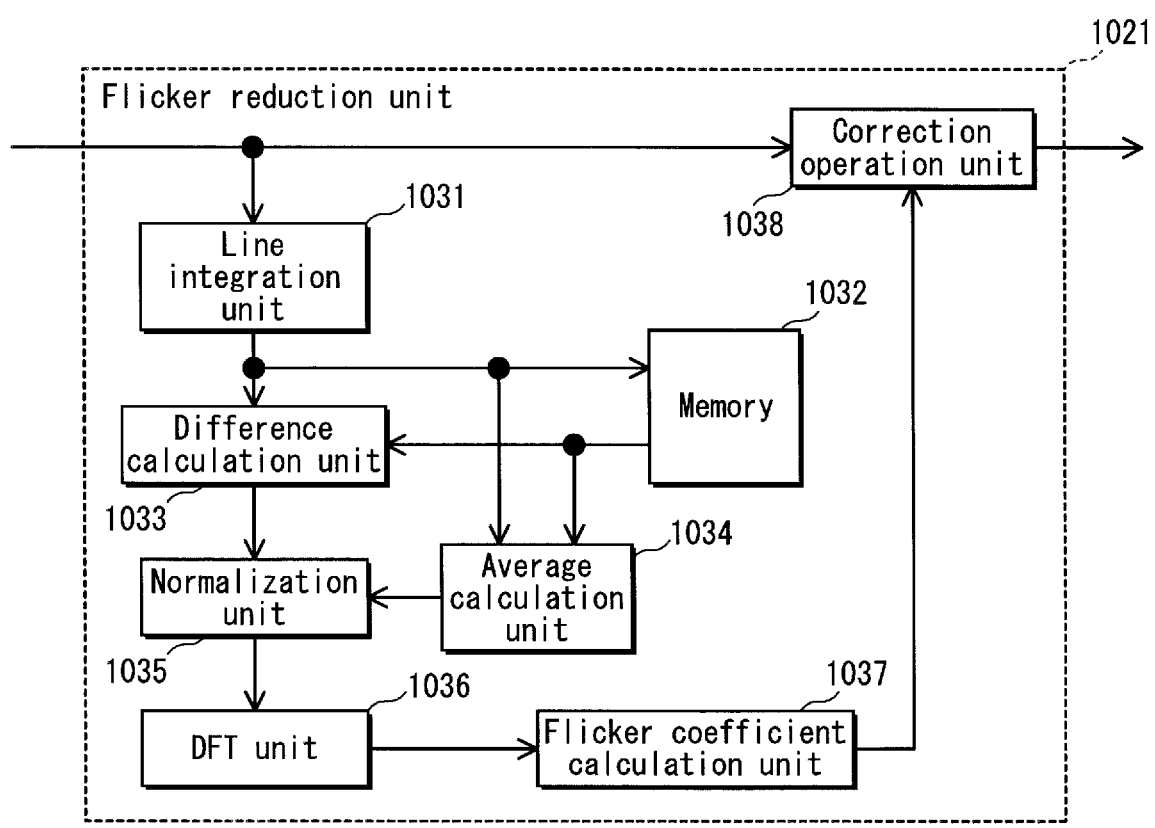
FIG. 9 is a block diagram showing a structure of a flicker reduction unit included in the conventional imaging device.

FIG. 7 is a block diagram showing a structural example of the digital signal processing unit 17*b* relating to the third embodiment.

A compression encoding unit 23*b* of the digital signal processing unit 17*b* includes the MV unit 71. When compression encoding is performed on a video image, the MV unit 71 performs inter frame prediction to detect a motion between frames of image blocks. The MV unit 71 of the compression encoding unit 23*b* detects a motion between frames of an image block, and outputs a motion vector based on a result of the detection to the sampling unit 32*b* of the flicker reduction unit 21*b*. Note that the compression encoding unit 23*b* has a function of outputting a motion vector to the sampling unit 32*b* of the flicker reduction unit 21*b*, in addition to the general structure of a compression encoding unit.

The flicker reduction unit 21*b* includes an acquisition unit 30*b* unit which is composed of a line integration unit 31 and a sampling unit 32*b*, a memory 33, an inter-screen DFT unit 34, a flicker extraction unit 35, an inter-line DFT unit 51, a flicker extraction unit 52, a flicker coefficient calculation unit 36, and a correction operation unit 37. The sampling unit 32*b* receives the motion vector from the MV unit 71 of the compression encoding unit 23*b*, and determines a horizontal line that is to be a sample target based on the received motion vector. Then, the sampling unit 32*b* samples a first line integral relating to the determined horizontal line, as a second line integral.

For example, the sampling unit 32*b* predicts a horizontal line of a current frame that corresponds to a horizontal line as a sample target of a previous frame, based on the motion vector received from the MV unit 71. Then, the sampling unit 32*b* determines the corresponding horizontal line of the current frame as a sample target, and samples a first line integral of the sample target horizontal line, as a second line integral. The sampling unit 32*b* performs the above prediction in the following way, for example. The number of horizontal lines corresponding to the received motion vector or the number of horizontal lines corresponding to a motion vector among a plurality of previous frames is connected to obtain an approximated curve. The number of horizontal lines corresponding to a motion vector from the previous frame to the current frame is estimated, and the estimated number of horizontal lines is added to or subtracted from the horizontal line as the sample target of the previous frame, to predict the corresponding horizontal line of the current frame. The method of predicting a corresponding horizontal line of a current frame with use of motion vector is not limited to the above method.

However, unlike in the first and second embodiments, in the third embodiment, the inter-screen DFT unit 34 does not always use second line integrals of horizontal lines at the same vertical coordinate for performing a discrete Fourier transform. Accordingly, in order for the inter-screen DFT unit 34 to identify second line integrals that constitute a second line integral sequence on which a discrete Fourier transform is to be performed, the sampling unit 32*b* for example performs processing of adding same identification information to the second line integrals relating to the same horizontal line for output. The inter-screen DFT unit 34 performs a discrete Fourier transform on a second line integral sequence, which is composed of a second line integral that relates to a horizontal line of an immediately previous frame and is sampled by the sampling unit 32*b* and second line integrals that relate to horizontal lines of a plurality of frames that are previous to the immediately previous frame and are read from the memory 33.

The flicker reduction unit 21*b* of the imaging device relating to the third embodiment exhibits the effects of the flicker reduction unit 21*a* relating to the second embodiment. Furthermore, by including the sampling unit 21*b* that determine a horizontal line as a sample target based on a motion vector calculated by the MV unit 71, the flicker reduction unit 21b can extract flicker component even when there is a change in image due to a motion of a subject, blurring due to a motion of the imaging device, or the like. This can reduce the flicker component contained in digital image signals more accurately.

<Supplementary Descriptions>

The present invention is not limited to the above embodiments, and can be carried out in any embodiment for achieving the aim of the present invention and an aim relating to or following the present invention. The following may be employed, for example.

(1) In the above embodiments, an equipment including a flicker reduction unit is described as an imaging device. Alternatively, an equipment including a flicker reduction unit may be a recorder, for example.

(2) In the above first embodiment, the acquisition unit 30 is composed of the line integration unit 31 and the sampling unit 32. Alternatively, the acquisition unit 30 may have the following structure, for example. The acquisition unit may select at least one but not all of horizontal lines that constitute one frame, namely among a plurality of horizontal lines, perform, for each of the selected horizontal lines, integration on digital image signals constituting the horizontal line, and output a line integral resulting from the integration, as a second line integral. This reduces an amount of operations performed by the acquisition unit, and therefore can reduce power consumed by the acquisition unit.

(3) In the above embodiments, the line integration unit 31 outputs, as a first line integral, a calculated line integral with no normalization. Alternatively, the line integration unit 31 may output, as a first line integral, a value which is obtained by dividing a line integral by the number of pixels constituting one horizontal line to normalize the line integral, for example.

(4) In the above embodiments, the line integration unit 31 performs integration on all digital image signals constituting one horizontal line to obtain a line integral, outputs the obtained line integral as a first line integral. Alternatively, the following may be employed. The line integration unit 31 performs integration on part of digital image signals constituting one horizontal line that satisfies a predetermined condition, to obtain a line integral. The line integration unit 31 divides the obtained line integral by the number of the part of the digital image signals to normalize the line integral, and outputs the normalized integral as a first line integral. The part of the digital image signals that satisfies the predetermined condition is, for example, digital image signals constituting a plurality of predetermined pixels in one horizontal line. In this case, the line integration unit 31 may output, as the first line integral, the obtained line integral with no normalization. Also, the part of the digital image signals that satisfies the predetermined condition is, for example, digital image signals whose values fall within a predetermined range (from a predetermined lower limit to a predetermined upper limit, for example) in one horizontal line. By defining the value to the predetermined lower limit or higher, a digital image signal is eliminated which might have a low SN ratio. Also, by defining the value to the upper limit or lower, a digital image signal is eliminated which might reach its saturation. Accordingly, there is expected to increase the calculation precision of frequency, phase, and amplitude ratio of flicker component.

(5) The sampling unit 32 and 32b relating to the above embodiments each may additionally have the following function. When a first line integral has a value falling outside of a predetermined range (from a predetermined lower limit to a predetermined upper limit), the sampling units 32 and 32b each judge that a horizontal line as a sample target relating to a second line integral is inappropriate. The sampling units 32 and 32b each change the sample target from this horizontal line to a horizontal line relating to any first line integral having a value falling within the predetermined range or a horizontal line relating to a largest first line integral having a value falling within the predetermined range. By adding such a function, there can expect an increase in the credibility of extracting flicker component.

(6) In the above embodiments, the inter-screen DFT unit 34 selects the most appropriate one among a plurality of horizontal lines relating to second line integrals sampled by the sampling unit 32, and performs a discrete Fourier transform on the selected horizontal line. Alternatively, the inter-screen DFT unit 34 may select any one of horizontal lines that are sample targets relating to second line integrals that fall within a predetermined range (from a predetermined lower limit to a predetermined upper limit), and perform a discrete Fourier transform on the selected horizontal line, for example. Further alternatively, the inter-screen DFT unit 34 may perform a discrete Fourier transform with respect to each of a small number of two or more horizontal lines, assess the correlation of Fourier coefficient between the horizontal lines, and adopt a Fourier coefficient having a high positive correlation. In this case, there can expect extraction of flicker component with a higher precision.

(7) The flicker reduction unit 21 relating to the above first embodiment may additionally have the following function. When flicker component extracted by the flicker extraction unit 35 has an amplitude or an amplitude ratio that is equal to a predetermined value or less, the flicker reduction unit 21 stops the correction operation unit 37 to perform an operation of reducing flicker component. Alternatively, the flicker reduction unit 21a and 21b respectively relating to the above second and third embodiments may additionally have the following function. When flicker component extracted by the flicker extraction unit 52 has an amplitude or an amplitude ratio that is equal to a predetermined value or less, the flicker reduction units 21a and 21b each stop the correction operation unit 37 to perform an operation of reducing flicker component. By adding such a function, the flicker reduction units 21, 21a, and 21b each do not perform operation processing including a division for each pixel, thereby achieving an effect of reducing power consumed by the correction operation unit 37.

(8) In the above first embodiment, the description is given with an aim of reducing flicker that occurs in the vertical coordinate direction of a frame due to an image sensor that performs line exposure (image sensor employing a rolling shutter method). Alternatively, the present invention may aim to reduce flicker that occurs between frames due to an image sensor employing a global shutter method such as a CCD (Charge Coupled Device) image sensor.

(9) The compression encoding unit 23 and the sampling unit 32 relating to the first embodiment may be replaced with the compression encoding unit 23b and the sampling unit 32b that each have the MV unit 71 relating to the third embodiment, respectively.

(10) In the above second and third embodiments, the flicker extraction unit 35 extracts a frequency, a phase, and an amplitude ratio of flicker component from a Fourier coefficient output by the inter-screen DFT unit 34. Alternatively, the flicker extraction unit 35 may extract only the frequency of the flicker component from the Fourier coefficient output by the inter-screen DFT unit 34, and output the extracted frequency to the inter-line DFT unit 51, for example. In this case, when the flicker extraction unit 52 cannot extract first information of the flicker component from a Fourier coefficient output by the inter-line DFT unit 51, it is impossible to reduce the flicker component contained in digital image signals. However, this reduces the processing load on the flicker extraction unit 35, thereby leading to a lower power consumption.

(11) In the above third embodiment, the sampling unit 32b predicts a horizontal line of a current frame that corresponds to a horizontal line selected from a previous frame, and samples a first line integral of the corresponding horizontal line of the current frame, as a second line integral. Alternatively, the sampling unit 32b may assess the dispersion of motion vectors at the same vertical position of the respective frames, and determine a horizontal line having the smallest dispersion at the vertical position, as a sample target, for example. This allows extraction of flicker component of a horizontal line relating to a small change in image. As a result, it is possible to more accurately reduce flicker component contained in digital image signals.

Here, an example is shown. It is desirable that an average of horizontal components of a motion vector is nearly 0 and a dispersion of the horizontal components is small, and a dispersion of vertical components of the motion vector is also small. In other words, this means a condition that an image moves in the vertical direction at a constant rate. Furthermore, if a condition is added that an average of the vertical components is nearly 0, to the above condition, a static condition is defined. When the sampling unit 32b does not perform processing depending on a motion, a horizontal line that satisfies the static condition is selected.

(12) In the above embodiments, the inter-screen DFT unit 34 performs a discrete Fourier transform on a second integral sequence in no consideration of commercial power frequency and frame rate. Alternatively, a discrete Fourier transform may be performed on a second integral sequence in consideration of commercial power frequency and frame rate.

For example, in the case where a commercial power frequency is limited to frequencies of 50 Hz and 60 Hz, frequencies of flicker of fluorescent lighting are 100 Hz and 120 Hz, respectively. When flicker reduction is performed in this limited case, determination of an imaging frame rate enables detection of a frequency at which a peak of Fourier coefficient is shown on which a discrete Fourier transform has been performed. Accordingly, the inter-screen DFT unit 34 estimates a frequency at which flicker component can possibly be detected, based on the commercial power frequency and the frame rate. The inter-screen DFT unit 34 calculates Fourier coefficients one-to-one corresponding to frequencies including the estimated frequency and an adjacent frequency. In this way, the inter-screen DFT unit 34 only needs to calculate the Fourier coefficients one-to-one corresponding to the frequencies including the estimated frequency and the adjacent frequency. Accordingly, the inter-screen DFT unit 34 does not need to calculate Fourier coefficients one-to-one corresponding to all the frequencies. This can largely reduce an amount of operations performed by the inter-screen DFT unit 34.

When the frame rate of 180 fps, a 100-Hz flicker shows its peak at 80 Hz and a 120-Hz flicker shows its peak at 60 Hz due to flicker component caused by aliasing. Accordingly, it is only necessary to calculate a Fourier coefficient corresponding to each of one or several frequencies adjacent to each of 80 Hz and 60 Hz, and assess the calculated Fourier coefficient.

Also in the above embodiments, the commercial power frequency of 50 Hz or 60 Hz is used. Alternatively, a possible commercial power frequency may be appropriately used instead. Furthermore in the above embodiments, the frame rate of 180 fps is used. Alternatively, a possible frame rate may be appropriately used instead.

(13) The imaging device and the flicker reduction unit included therein relating to the above embodiments each may be realized as an LSI that is an integrated circuit, for example. The above imaging device and flicker reduction unit each may be separately integrated into one chip, or integrated into one chip including part or all of the imaging device and the flicker reduction unit. Although the LSI is used here, the LSI may be called an IC, a system LSI, a super LSI, or an ultra LSI, depending on the integration degree. Also, a method of forming integrated circuits is not limited to LSIs, and may be realized using a dedicated circuit or a general-purpose processor. Furthermore, it may be possible to use an FPGA (Field Programmable Gate Array) programmable after manufacturing LSIs or a reconfigurable processor in which connection and setting of a circuit cell inside an LSI can be reconfigured. Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

(14) The operation procedures of the flicker reduction unit described in the above embodiments may at least partially be described in a program, and a CPU (Central Processing Unit) may read and execute the program stored in a memory, for example. Alternatively, the program may be saved in a recording medium for distribution, for example.

(15) Part of the structure of the flicker reduction unit described in the above embodiments may be realized by a device or an integrated circuit, and the operation procedures of the structure of the flicker reduction unit except the part may be described in a program, and a CPU may read and execute the program stored in a memory, for example.

(16) The descriptions of the above embodiments and the above supplementary descriptions may be appropriately combined.

[Industrial Applicability]

The present invention is useful as a means for reducing, from image signals relating to a captured image, components of flicker that appears on the captured image as a phenomenon of increase and decrease in brightness due to light flickering.

[Reference Signs List]

10: imaging device
 11: imaging optical component
 12: imaging element
 13: system controller
 14: optical driver
 15: IS control unit (image sensor control unit)
 16: AFE unit (analog front end unit)
 17 and 17b: digital signal processing unit
 21, 21b, and 21c: flicker reduction unit
 22: signal processing unit
 23 and 23b: compression encoding unit
 30: acquisition unit
 31: line integration unit
 32 and 32b: sampling unit
 33: memory
 34: inter-screen DFT unit
 35: flicker extraction unit
 36: flicker coefficient calculation unit
 37: correction operation unit
 51: inter-line DFT unit
 52: flicker extraction unit
 71: MV unit (motion vector detection unit)

The invention claimed is:

1. A flicker reduction device for reducing flicker components due to lighting that are contained in image signals imaged by imaging elements, the flicker reduction device comprising:
   an acquisition unit operable to acquire, for each screen, a sample line integral relating to each of at least one but not all of horizontal lines that constitute the screen, based on the image signals;
   a memory operable to store therein sample line integrals corresponding to a plurality of screens acquired by the acquisition unit;
   an inter-screen discrete Fourier transform unit operable to perform a discrete Fourier transform on a sample line integral sequence that is composed of (i) a sample line integral of one screen that has been most recently acquired by the acquisition unit and (ii) sample line integrals of a plurality of screens previous to the one screen that are stored in the memory, the most recently acquired sample line integral and the stored sample line integrals relating to horizontal lines at the same position in the respective screens;
   a flicker extraction unit operable to extract information of the flicker components based on a result of the discrete Fourier transform performed by the discrete Fourier transform;
   a flicker coefficient calculation unit operable to calculate a flicker coefficient for the image signals based on the information extracted by the flicker extraction unit; and
   a correction calculation unit operable to perform an operation for reducing the flicker components on the image signals based on the flicker coefficient calculated by the flicker coefficient calculation unit.

2. The flicker reduction device of claim 1, wherein
   the acquisition unit includes:
   a line integration unit operable, for each of horizontal lines that constitute each screen, to perform integration on either all of image signals of the horizontal line or part of the image signals that satisfies a predetermined condition, and output, as a first line integral, either an integral resulting from the integration or a normalized integral obtained by normalizing the integral; and
   a sampling unit operable to sample, as the sample line integral, the first line integral relating to each of the at least one but not all of the horizontal lines among the first line integrals relating to the horizontal lines;
   the flicker reduction device further comprises:
   an inter-line discrete Fourier transform unit operable to perform a discrete Fourier transform on a first line integral sequence that is composed of first line integrals relating to horizontal lines that constitute a screen, in a period based on a frequency of the flicker components included in the information; and
   a first flicker extraction unit operable to extract first information of the flicker components based on the result of the discrete Fourier transform, and
   the flicker coefficient calculation unit performs the calculation based on the first information extracted by the first flicker extraction unit.

3. The flicker reduction device of claim 2, wherein
   when a horizontal line that is a sample target relates to a first line integral having a value outside of a predetermined range, the sampling unit changes the sample target from the horizontal line to another horizontal line that relates to a first line integral having a value within the predetermined range.

4. The flicker reduction device of claim 2, wherein
   the sampling unit determines a horizontal line as a sample target based on a motion vector in image block between screens.

5. The flicker reduction device of claim 2, wherein
   the inter-screen discrete Fourier transform unit estimates a frequency at which the flicker components have a possibility to be detected based on a commercial power frequency and a frame rate relating to the image signals, and performs the discrete Fourier transform on the sample line integral sequence based on the estimated frequency.

6. An integrated circuit for reducing flicker components due to lighting that are contained in image signals imaged by imaging elements, the integrated circuit comprising:
   an acquisition unit operable to acquire, for each screen, a sample line integral relating to each of at least one but not all of horizontal lines that constitute the screen, based on the image signals;
   a memory operable to store therein sample line integrals corresponding to a plurality of screens acquired by the acquisition unit;
   an inter-screen discrete Fourier transform unit operable to perform a discrete Fourier transform on a sample line integral sequence that is composed of (i) a sample line integral of one screen that has been most recently acquired by the acquisition unit and (ii) sample line integrals of a plurality of screens previous to the one screen that are stored in the memory, the most recently acquired sample line integral and the stored sample line integrals relating to horizontal lines at the same position in the respective screens;
   a flicker extraction unit operable to extract information of the flicker components based on a result of the discrete Fourier transform performed by the discrete Fourier transform;
   a flicker coefficient calculation unit operable to calculate a flicker coefficient for the image signals based on the information extracted by the flicker extraction unit; and
   a correction calculation unit operable to perform an operation for reducing the flicker components on the image signals based on the flicker coefficient calculated by the flicker coefficient calculation unit.

7. A flicker reduction method for reducing flicker components due to lighting that are contained in image signals imaged by imaging elements, the flicker reduction method comprising:
   an acquiring step of acquiring, for each screen, a sample line integral relating to each of at least one but not all of horizontal lines that constitute the screen, based on the image signals;
   a storing step of storing, in a memory, sample line integrals corresponding to a plurality of screens acquired in the acquiring step;
   an inter-screen discrete Fourier transforming step of performing a discrete Fourier transform on a sample line integral sequence that is composed of (i) a sample line integral of one screen that has been most recently acquired in the acquiring step and (ii) sample line integrals of a plurality of screens previous to the one screen that are stored in the memory, the most recently acquired sample line integral and the stored sample line integrals relating to horizontal lines at the same position in the respective screens;

a flicker extracting step of extracting information of the flicker components based on a result of the discrete Fourier transform performed in the discrete Fourier transforming step;
a flicker coefficient calculating step of calculating a flicker coefficient for the image signals based on the information extracted in the flicker extracting step; and
a correction calculating step of performing an operation for reducing the flicker components on the image signals based on the flicker coefficient calculated in the flicker coefficient calculating step.

* * * * *